(12) United States Patent
Yang et al.

(10) Patent No.: US 12,032,626 B2
(45) Date of Patent: Jul. 9, 2024

(54) IMAGE SEARCHING USING A FULL-TEXT SEARCH ENGINE

(71) Applicant: Walmart Apollo, LLC, Bentonville, AR (US)

(72) Inventors: Binwei Yang, Milpitas, CA (US); Omer Ovenc, San Jose, CA (US); Behzad Ahmadi, San Jose, CA (US); Cun Mu, Jersey City, NJ (US); Zheng Yan, Short Hills, NJ (US); Guang Yang, Jersey City, NJ (US); Jun Zhao, Jersey City, NJ (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 18/103,979

(22) Filed: Jan. 31, 2023

(65) Prior Publication Data

US 2023/0169109 A1    Jun. 1, 2023

Related U.S. Application Data

(63) Continuation of application No. 16/779,519, filed on Jan. 31, 2020, now Pat. No. 11,625,429.

(51) Int. Cl.
*G06F 16/53* (2019.01)
*G06F 16/532* (2019.01)
(Continued)

(52) U.S. Cl.
CPC ............ *G06F 16/56* (2019.01); *G06F 16/532* (2019.01); *G06F 16/583* (2019.01); *G06F 16/9014* (2019.01); *G06Q 30/0627* (2013.01)

(58) Field of Classification Search
CPC ..... G06F 16/56; G06F 16/583; G06F 16/9014
See application file for complete search history.

(56) References Cited

U.S. PATENT DOCUMENTS 8,352,494 B1    1/2013  Badoiu
2006/0262976 A1  11/2006  Hart et al.
(Continued)

OTHER PUBLICATIONS

Mu, et al., "An Empirical Comparison of FAISS and FENSHSES for Nearest Neighbor Search in Hamming Space," Proceedings of the SIGIR 2019 eCom Workshop [online], Jul. 2019, Paris, France, <URL: http://ceur-ws..org>, 2019. Retrieved from the Internet <URL:http://ceur-ws.org/Vol-2410/paper35.pdf>[retrieved on Apr. 19, 2020].

(Continued)

*Primary Examiner* — Loc Tran
(74) *Attorney, Agent, or Firm* — BRYAN CAVE LEIGHTON PAISNER LLP

(57) ABSTRACT

A method including pre-screening second images from a database for a search result based on a first image and also based on respective substring distances between first binary substrings for the first image and respective second binary substrings for each of the second images. The method further can include after the pre-screening, determining a respective image distance for each third image of third images of the search result, wherein the respective image distance is between the first image and the each third image of the third images of the search result, and after determining the respective image distance for each third image of the third images of the search result, when the respective image distance for a particular one of the third images is greater than a predetermined image distance threshold, removing the particular one of the third images from the search result before the search result is displayed on a user device requesting the search result. Other embodiments are disclosed.

20 Claims, 6 Drawing Sheets

(51) Int. Cl.
*G06F 16/56* (2019.01)
*G06F 16/583* (2019.01)
*G06F 16/901* (2019.01)
*G06Q 30/0601* (2023.01)

(56) References Cited

U.S. PATENT DOCUMENTS

| | | | |
|---|---|---|---|
| 2009/0112830 A1 | 4/2009 | Denoue et al. | |
| 2009/0324077 A1 | 12/2009 | Wu et al. | |
| 2010/0166321 A1 | 7/2010 | Sawant et al. | |
| 2013/0262488 A1 | 10/2013 | Shirakawa et al. | |
| 2014/0201219 A1* | 7/2014 | Kim | G06F 16/5866 707/749 |
| 2014/0270530 A1 | 9/2014 | Dwan et al. | |
| 2015/0178786 A1* | 6/2015 | Claessens | G06Q 30/0277 705/14.66 |
| 2015/0256601 A1 | 9/2015 | Mosko | |
| 2016/0117347 A1 | 4/2016 | Nielsen et al. | |
| 2016/0350583 A1* | 12/2016 | Nishino | G06V 40/172 |
| 2017/0228588 A1 | 8/2017 | Castillo et al. | |
| 2018/0157681 A1 | 6/2018 | Yang et al. | |
| 2019/0130216 A1* | 5/2019 | Tomioka | G06F 18/214 |
| 2019/0266271 A1 | 8/2019 | Leau | |
| 2019/0332716 A1 | 10/2019 | Lawrence | |

OTHER PUBLICATIONS

Mu, et al., "Fast and Exact Nearest Neighbor Search in Hamming Space on Full-Text Search Engines," Similarity Search and Applications [online], 2019, Lecture Notes in Computer Science, vol. 11087, pp. 49-56, Springer, <URL: https://doi.org/10.1007/978-3-030-32047-/>. Retrieved from the Internet <URL: https://arxiv.org/pdf/1902.08498.pdf?source=post_page> [retrieved on Apr. 19, 2020].

* cited by examiner

400

410 Determine a first binary vector comprising binary substrings for a first image.

420 Minimize a respective bit correlation within each of binary substrings of the first binary vector by permutation.

430 Obtain second images by searching a database based on the first binary vector.

440 Obtain a respective second binary vector for each of the second images from the database.

450 Add any of the second images to a search result that has a respective substring distance with the first binary vector not greater than a predetermined substring distance threshold.

460 Cull any third image from the search result that has a respective image distance between the third image and the first image is greater than a predetermined image distance threshold.

510 Receiving, from a user device via a network, a search request associated with a first image in a database by a user.

520 Obtain a first binary vector comprising binary substrings for the first image from the database.

530 Obtain second images and a respective second binary vector for each of the second images by searching the database based on the first binary vector.

540 Add any of the second images to a search result that has any respective substring distance not greater than a predetermined substring distance threshold.

550 Cull any third image from the search result that has a respective image distance between the third image and the first image is greater than a predetermined image distance threshold.

560 Transmit a representative image determined from the first image and the search result based on a criterion to be displayed on the user device.

FIG. 5

IMAGE SEARCHING USING A FULL-TEXT SEARCH ENGINE

CROSS-REFERENCE TO RELATED APPLICATIONS

This application is a continuation of U.S. patent application Ser. No. 16/779,519, filed Jan. 31, 2020. U.S. patent application Ser. No. 16/779,519 is incorporated herein by reference in its entirety.

TECHNICAL FIELD

This disclosure relates generally to systems or methods of image searching using a full-text search engine.

BACKGROUND

Conventional image retrieval systems or methods use vector similarity searches, e.g., nearest neighbor search (NNS) within semantic embeddings. These systems or methods are mostly implemented in main memory and are not suitable for searching within a large quantity of images. Therefore, systems and/or methods that implement NNS and can balance speed and the cost of the limited memory space for image searching are desired.

BRIEF DESCRIPTION OF THE DRAWINGS

To facilitate further description of the embodiments, the following drawings are provided in which:

FIG. 4 illustrates a flow chart for a method of determining one or more similar images based on an input image, according to an embodiment;

FIG. 5 illustrates a flow chart for a method of determining and grouping similar images, according to an embodiment.

Figure 1:
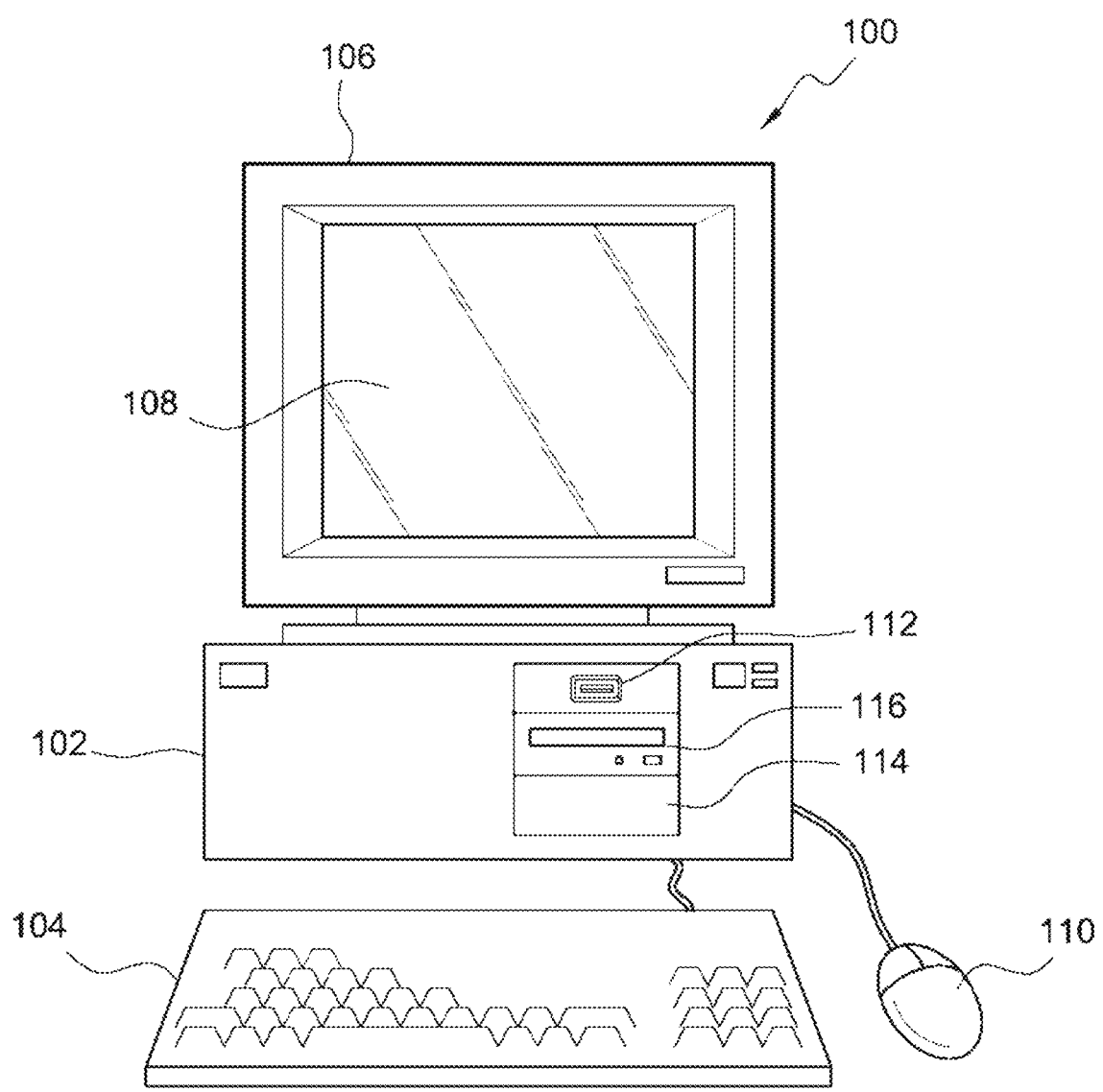
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, or a minute.

Description of Examples of Embodiments

Figure 2:
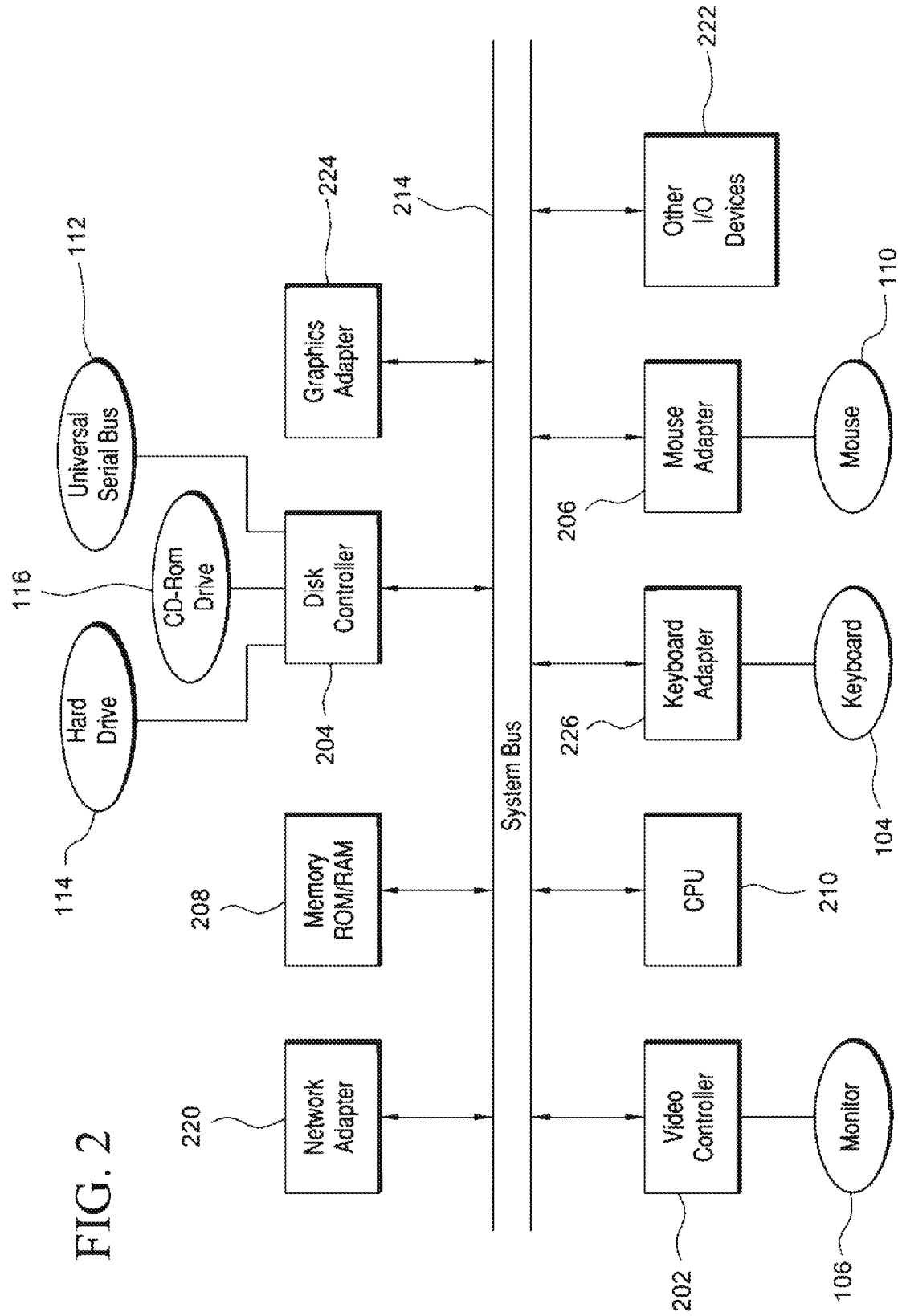
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
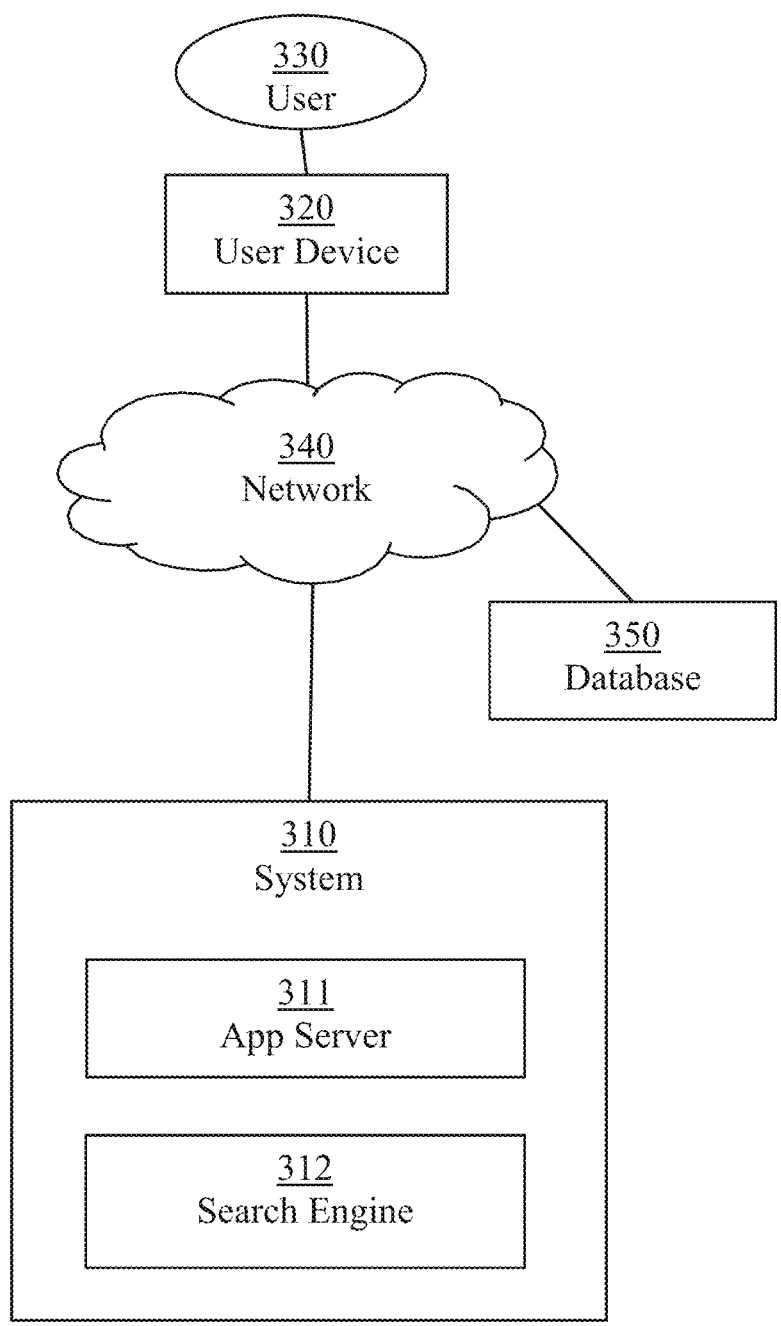
FIG. 3 illustrates a block diagram of a system that can be employed for various image-related applications using a text-based search engine, according to an embodiment.

Turning ahead in the drawings, FIG. 3 illustrates a block diagram of a system 300 that can be employed for various image-related applications using a text-based search engine, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include one or more systems (e.g., a system 310) and one or more user devices (e.g., a user device 320). System 310 and/or user device 320 can each be a computer system, such as computer system 100 (FIG. 1), as described above, and can each be a single computer, a single server, or a cluster or collection of computers or servers, or a cloud of computers or servers. In another embodiment, a single computer system can host each of system 310 and/or user device 320. In many embodiments, system 310 can be modules of computing instructions (e.g., software modules) stored at non-transitory computer readable media that operate on one or more processors. In other embodiments, system 310 can be implemented in hardware. In many embodiments, system 310 can comprise one or more systems, subsystems, modules, or servers. Additional details regarding system 310 and/or user device 320 are described herein. In some embodiments, system 310 can be in data communication, through a computer network, a telephone network, or the Internet (e.g., a network 340), with a user device 320. In some embodiments, user device 320 can be used by users, such as users 330.

In some embodiments, an internal network (e.g., network 340) that is not open to the public can be used for communications between system 310 and user device 320 within system 300. Accordingly, in some embodiments, system 310 (and/or the software used by such systems) further can comprise a back end subsystem operated by an operator and/or administrator of system 310. For example, the back end subsystem of system 310 can host an e-commerce transaction system, a customer relationship management system, and/or a data storage system, etc. In these or other embodiments, the operator and/or administrator of system 310 can manage system 310, the processor(s) of system 310, and/or the memory storage unit(s) of system 310 using the input device(s) and/or display device(s) of system 310.

In certain embodiments, the user devices (e.g., user device 320) can be desktop computers, laptop computers, a mobile device, and/or other endpoint devices used by one or more users (e.g., users 330). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, system 310 can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 310. In a similar manner, the processors and/or the non-transitory computer-readable media can be local and/or remote to each other.

Meanwhile, in many embodiments, system 310 also can be configured to communicate with one or more databases (e.g., a database 350). The one or more databases can include a product database that contains information about products, items, or SKUs (stock keeping units), for example, including product images, product descriptions, profit margins or markups for the products, and/or promotion information for the products in a retailer, among other information, as described below in further detail. The one or more databases further can include a transaction database that contains transactions by users (e.g., 330), including information such as sale volumes or ratings of the products, etc., as described below in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases (e.g., 350) can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, system 300, system 310, user device 320, and/or database 350 can be implemented using any suitable manner of wired and/or wireless communication. Accordingly, system 300, system 310, and/or user device 320 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In a number of embodiments, system 310 can comprise an application server 311 that hosts one or more websites, one or more servers, and/or mobile application servers. In many embodiments, system 310 further can comprise a search engine 312 for searching items (e.g., products) from a database 350 based on a search query from user 330, via a user device 320, through a network 340 and application server 311. In a number of embodiments, application server 311 can host an e-commerce system that interfaces with a mobile application on user device 320, which can allow user 330 to search for items (e.g., products), to add items to an electronic cart, and/or to purchase items, in addition to other suitable activities. When application server 311 receives a search query from user 330, application server 311 can forward the search query to search engine 312 for processing. The search query can include texts (e.g., keywords or product descriptions) and/or images (e.g., a first image for a first product).

In many embodiments, system 300, system 310, and/or search engine 312 can determine a first binary vector comprising binary substrings for a first image in a search query. The first image can be uploaded by user 330 or selected by user 330 from database 350. In a number of embodiments, system 300, system 310, and/or search engine 312 can determine the first binary vector by: (a) generating a first hash value for the first image; and (b) dividing bits of the first hash value into the binary substrings. For example, the first hash value can be generated by one or more of hashing techniques, such as perceptual hashing (pHash), difference hashing (dHash), wavelet hashing (wHash), average hashing (aHash), and so forth. The first hash value can comprise multiple bits in a sequence, and system 300, system 310, and/or search engine 312 can divide the bits into multiple binary substrings of a uniform length, such as blocks of 64, 256, 1024, or 4906 bits. For example, when the first hash value (B) comprises m bits ($b_i$, $1 \leq i \leq m$), the first binary vector can comprises s binary substrings (b', $1 \leq j \leq s$), with each binary substring being m/s bits long:

$$[\underbrace{b_1, ..., b_{\frac{m}{s}}}_{b^1}, \underbrace{b_{\frac{m}{s}+1}, ..., b_{\frac{2m}{s}}}_{b^2}, ..., \underbrace{b_{m-\frac{m}{s}+1}, ..., b_m}_{b^s}]$$

System 300, system 310, and/or search engine 312 further can minimize a respective bit correlation within each of the binary substrings of the first binary vector by permutation. For example, system 300, system 310, and/or search engine 312 can adopt a graph partitioning approach (e.g., the Kernighan-Lin algorithm) by finding appropriate pairs i,j∈ [m] and swapping the mappings of the i-th bit and the j-th bit in a binary substring of m bits in a permutation until a minimum cut cost is achieved.

In some embodiments, system 300, system 310, and/or search engine 312 also can obtain, in real-time after determining the first binary vector, the second images from database 350 by searching database 350 based on the first binary vector. In a number of embodiments, search engine 312 can be a text-based search engine (e.g., a full-text search engine) and can search the second images using the integers formed by the binary substrings of the first binary vector as search keywords. In many embodiments, each of the second images can be associated with a respective second binary vector and further can be indexed in database 350 based at least in part on the respective binary second vector, or respective binary substrings of the respective binary second vector. In embodiments where a respective second binary vector is associated with each of the second images and stored in database 350, system 300, system 310, and/or search engine 312 also can obtain the respective second binary vector from database 350.

System 300, system 310, and/or search engine 312 further can apply one or more pre-screening approaches (e.g., sub-code or substring filters) to limit the number of images in an initial search result. In some embodiments, system 300, system 310, and/or search engine 312 can use a mathematical formula, e.g., an image distance, to determine the similarity between two images. In certain embodiments, the image distance between 2 images can be determined based on a respective substring distance between each pair of respective binary substrings for the images.

For example, system 300, system 310, and/or search engine 312 can determine the similarity of 2 images based on the Hamming distance between the respective hash values of the 2 images (e.g., $d_H(q, b)$). A Hamming distance between two m-bit binary codes is a count of bit positions that are different. As such, the Hamming distance for the images is a sum of the respective Hamming distance between each pair of the respective binary substrings (e.g., $d_H(q_i, b_i)$):

$$d_H(q, b) = \sum_{i \in [s]} d_H(q_i, b_i)$$

In a number of embodiments, system 300, system 310, and/or search engine 312 further can determine that if a respective substring distance between each pair of the respective binary substrings for 2 images (e.g., the first image and each of the second images) is greater than a predetermined substring distance threshold, the 2 images cannot be similar. Similarly, when a respective substring distance between any pair of the respective binary substrings for 2 images (e.g., the first image and each of the second images) is equal to, or less than, a predetermined substring distance threshold, the 2 images can likely be similar. Referring to the example above, the predetermined substring distance threshold can be $$\left\lfloor \frac{r}{s} \right\rfloor,$$

where r is the predetermined image distance threshold and s is the number of binary substrings of any binary vector (e.g., the first binary vector or the respective second binary vector). Accordingly, system 300, system 310, and/or search engine 312 can determine an initial search result based on the images of the second images whose hash values are illustrated as below:

$$\bigcup_{i=1}^{S} \left\{ b \in \mathcal{B} \,\middle|\, b^i \in B_H\!\left(q^i, \left\lfloor \frac{r}{s} \right\rfloor\right) \right\},$$

where:
q: the hash value of the image in the search query (e.g., the first image);
r: the predetermined image distance threshold;
s: the number of binary substrings;
b: one of the hash values $\mathcal{B}$ (e.g., a set of the respective hash value for each of the second images);
$b^j$: the j-th binary substring of the hash value b; and $$B_H\!\left(q^i, \left\lfloor \frac{r}{s} \right\rfloor\right):$$

a set of hash values whose i-th binary substrings each have a respective substring distance to $q^i$ not greater than $$\left\lfloor \frac{r}{s} \right\rfloor.$$

In a number of embodiments, after applying the filter(s), if any, system 300, system 310, and/or search engine 312 can determine a respective image distance between the first image and each image of the search result (e.g., the initial search result) and can determine a final search result by culling any third image of the search result whose respective image distance is greater than the predetermined image distance threshold (e.g., r) from the initial search result.

Furthermore, in some embodiments, the search request by user 330 from user device 320 via network 340, received by system 300, system 310, application server 311, and/or search engine 312, can be associated with a grouping command to combine or consolidate images similar to the first image that can be provided by user 330 or selected by user 330 from the database. User 330 can request such grouping via user settings or commands sent via user device 320. In some embodiments, system 300, system 310, application server 311, and/or search engine 312 can be configured to combine the grouping command with certain user commands. For example, when user 330 searches for items (e.g., products) with a search query that can result in a large amount of matching listings (e.g., searching for all lamps from an online retailer), system 300, system 310, application server 311, and/or search engine 312 can proactively group the item listings with identical or almost identical item images.

After grouping, system 300, system 310, application server 311, application server 311, and/or search engine 312 further can determine a representative image from the grouped images (e.g., the first images and images in the search result) based on a criterion and also can transmit, via network 350, the representative image to be displayed on user device 320. In some embodiments, the criterion for selecting the representative image can be at least one of: (a) a popularity of a representative item associated with the representative image among users; (b) a profit margin of the representative item; (c) a markup of the representative item; (d) a promotion of the representative item by a retailer; (e) a sales ranking of the representative item; (f) a user rating for the representative item, etc.

In a number of embodiments, system 300 and/or system 310 can allow user 330 or application server 311 to adjust the predetermined image distance threshold so that the search result can be images similar to, or near duplicate of, the first image, based on the choice of user 330 or the settings of application server 311. In some embodiments, system 300 and/or system 310 can further include machine learning modules configured to automatically adjust the image distance threshold, the size of each binary substring, etc., based at least in part on one or more of: feedbacks of administrators or operators, the average speed of searches, the size of the search results, a percentage of out-of-stock items, and so forth.

For platforms that can access a large number of images to be searched, such as an ecommerce platform having over 50 thousand, 90 thousand, or 200 million images for items, the number of images retrieved from database 350 (e.g., the second images) can be massive, and determining similar images from the massive number of images thus can be time consuming. In addition, despite the huge number of images, users generally expect to receive search results in seconds. Further, image searching involving image processing (e.g., extracting image embeddings) can consume a lot of memory space.

In many embodiments, system 300, system 310, and/or search engine 312 can provide a technology-based solution to balance the search latency and the memory usage. In some embodiments, system 300, system 310, and/or search engine 312 can use various bit-operation techniques, including generating a binary vector with multiple binary substrings or sub-codes for a hash value for an image, indexing the image based on the binary vector, and using a full-text search engine to search similar images based at least in part on the binary vector, etc., to obtain the initial search result faster. In several embodiments, system 300, system 310, and/or search engine 312 further can adopt pre-screening (e.g., sub-code/substring filtering) techniques to limit the number of potentially similar images, thus reducing the time spent on calculating the image distance (e.g., Hamming distance) to determine similar images. In certain embodiments, system 300, system 310, and/or search engine 312 also can save time by avoiding linear searching and determining an image distance (e.g., a Hamming distance) based on substring distances. In a number of embodiments, system 300, system 310, and/or search engine 312 can access or process indexes of images stored in a non-transitory computer readable media or a hard drive (e.g., 144 (FIG. 1)) to reduce the consumption of main memory space.

Conventional systems, such as nearest neighbor search (NNS) within semantic embeddings, are unable to lower the usage of main memory because they are implemented in main memory. Moreover, conventional text-based systems, such as term match systems, are unable to lower search latency when they are searching a large quantity of images. In many embodiments, bit-operation and sub-code filtering techniques provided by system 300, system 310, and/or search engine 312 can advantageously address the problem by using a disk-based full-text search engine with fast pre-screening or sub-code filtering to sift out images that can be easily determined to have a distance greater than the predetermined image distance threshold (e.g., a similarity threshold) before performing the time-consuming comparison of the images.

Turning ahead in the drawings, FIG. 4 illustrates a flow chart for a method 400 of determining one or more similar images based on an input image, according to an embodiment. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3) system 310 (FIG. 3), and/or search engine 312 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of system 300 (FIG. 3), system 310 (FIG. 3), and/or search engine 312 (FIG. 3). The processor(s) can be similar or identical to the processor(s) described above with respect to computer system 100 (FIG. 1).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include a block 410 of determining a first binary vector comprising binary substrings for a first image. The first binary vector can be determined based on a first hash value of the first image generated by one or more hashing algorithms, such as pHash, aHash, etc. The binary substrings each can have a uniform length, such as 64 bits, 256 bits, or 1028 bits, etc. The first image can be provided by a user (e.g., 330 (FIG. 3)) as an image file uploaded or a hyperlink to the image. The first image also can be selected by the user from the images in a database (e.g., 350 (FIG. 3)). When the first image is new, method 410 can determine the first hash value and the first binary vector in real-time after receiving the first image. When the first image is saved in the database, method 410 can generate the first hash value and the first binary vector before saving the first image to the database, and determining the first binary vector in block 410 comprises obtaining the first binary vector from the database.

Method 400 also can include a block 420 of minimizing a respective bit correlation within each of binary substrings of the first binary vector by any suitable permutation algorithms (e.g., the Kernighan-Lin algorithm). When the first image is retrieved from the database, the bits in the binary substrings of the first binary vector can be permuted previously, before the first image is saved to the database, and method 400 thus can skip block 420.

Method 400 further can include a block 430 of obtaining second images by searching the database (e.g., 350 (FIG. 3)) based on the first binary vector. In many embodiments, the second images can be indexed based on their respective second binary vectors, and the indexes of the second images each can be saved in a secondary storage device, such as hard drives (e.g., 114 (FIG. 1)). Block 430 also can perform a disk-based full-text search using the binary substrings of the first binary vector, or integers thereof, as search terms to find the second images in real-time.

Method 400 additionally can include a block 440 of obtaining the respective second binary vector for each of the second images from the database. In some embodiments, block 440 can be combined with block 430.

Furthermore, method 400 can include a block 450 of adding any of the second images to a search result that has a respective substring distance with the first binary vector not greater than a predetermined substring distance threshold. In a number of embodiments, method 440 can use Hamming distances to determine the substring or image distances, and the predetermined substring distance threshold can be $$\left\lfloor \frac{r}{s} \right\rfloor,$$

where r is the predetermined Hamming image distance threshold and s is the number of binary substrings of a binary vector. Block 450 can be used to initialize the search result and/or perform sub-code or substring filtering to reduce the number of images for method 400 to calculate the respective image distances.

Finally, method 400 can include a block 460 of culling any third image from the search result that has a respective image distance between the third image and the first image is greater than a predetermined image distance threshold (e.g., r). After block 460 or as part of block 460, method 400 can include transmitting one or more images from the search result, as culled, to be displayed on a user interface of the user device Turning ahead in the drawings, FIG. 5 illustrates a flow chart for a method 500 of determining and grouping multiple similar images, according to an embodiment. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped.

In many embodiments, system 300 (FIG. 3) system 310 (FIG. 3), application server 311 (FIG. 3), and/or search engine 312 (FIG. 3) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of system 300 (FIG. 3) and/or system 310 (FIG. 3). The processor(s) can be similar or identical to the processor(s) described above with respect to computer system 100 (FIG. 1).

In some embodiments, method 500 and other blocks in method 500 can include using a distributed network including distributed memory architecture to perform the associated activity. This distributed architecture can reduce the impact on the network and system resources to reduce congestion in bottlenecks while still allowing data to be accessible from a central location.

Referring to FIG. 5, method 500 can include a block 510 of receiving, from a user device (e.g., 320 (FIG. 3)) via a network (e.g., 340 (FIG. 3)), a search request associated with a first image in a database (e.g., 350 (FIG. 3)) by a user (e.g., 330 (FIG. 3)). The first image can be associated with an item (e.g., a product).

Method 500 further can include a block 520 of obtaining a first binary vector comprising binary substrings for the first image from the database. In many embodiments, method 500 additionally can include a block of generating a binary vector for an image, similar or identical to block 410 (FIG. 4), and saving the binary vector with the image when the image is being saved to the database.

Method 500 also can include a block 530 of obtaining second images and a respective second binary vector for each of the second images by searching the database based on the first binary vector. Block 530 can be similar or identical to block 430 (FIG. 4). Similar to the first image, the second images can be associated with items (e.g., products).

Further, method 500 can include sub-code/sub-string filtering by a block 540 of adding any of the second images to a search result that has any respective substring distance not greater than a predetermined substring distance threshold. Block 540 can be similar or identical to block 450 (FIG. 4).

Method 500 can include a block 550 of culling any third image from the search result that has a respective image distance between the third image and the first image is greater than a predetermined image distance threshold. Block 550 can be similar or identical to block 460 (FIG. 4).

Method 500 also can include a block 560 of transmitting a representative image determined from the first image and the search result based on a criterion to be displayed on a user interface of the user device. The criterion can be the image associated with: (a) the most popular item; (b) the most profitable item; (c) the item in promotion; or (d) the item of a specific brand, and/or another suitable criterion.

Figure 6:
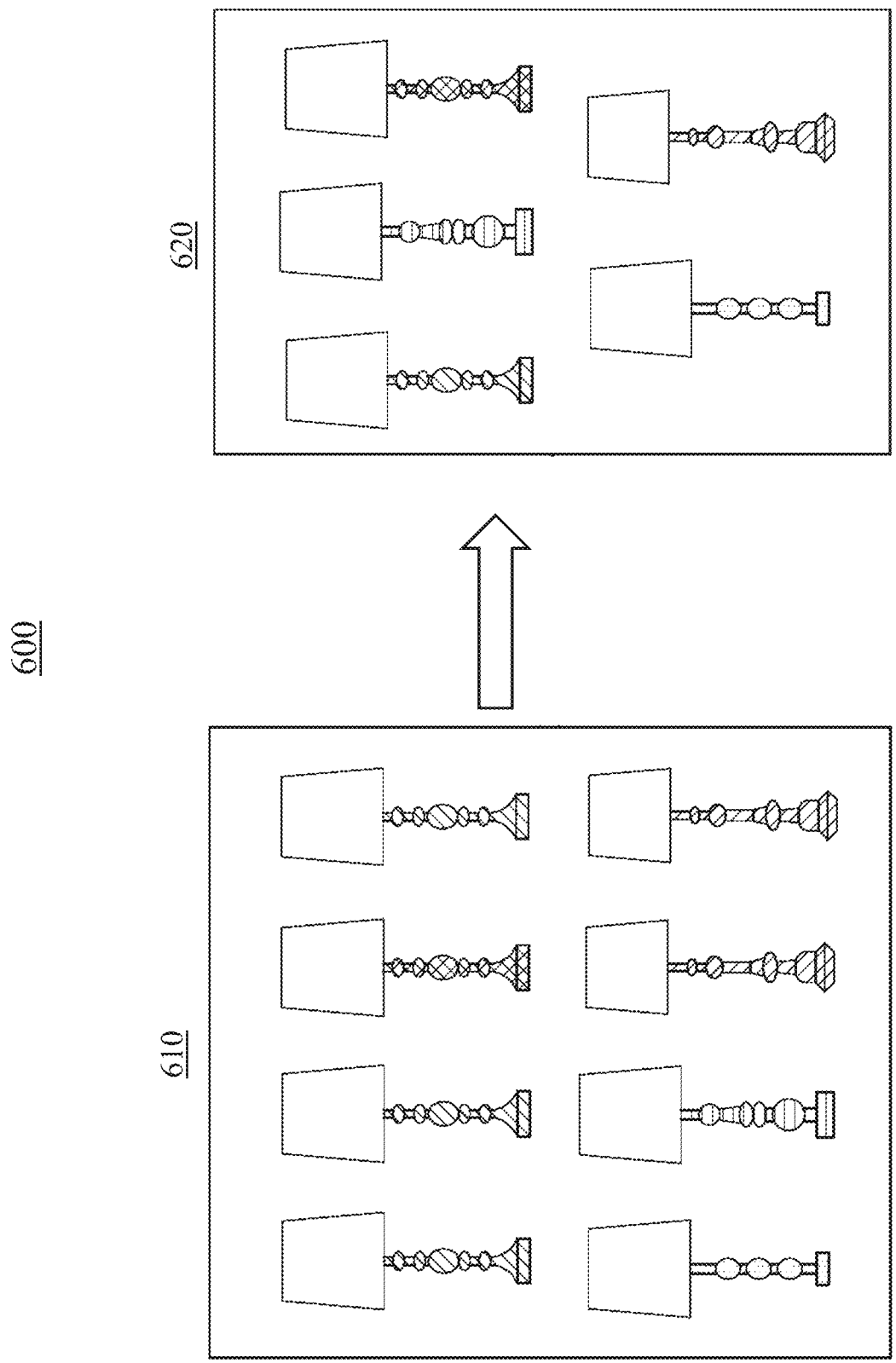
FIG. 6 illustrates an exemplary display of a first set of images and a second set of images including a representative image for the first set of images.

Turning ahead in the drawings, FIG. 6 illustrates an exemplary display 600 of a set of images 610 and a set of images 620 including a representative image for the set of images 610. Display 600 is merely exemplary and is not limited to the embodiments presented herein.

Referring to FIG. 6, set of images 610 can include item images to be presented to a user (e.g., 330 (FIG. 3)) in response to a user request, such as when the user requests a search result of lamps represented by their respective images. As shown in FIG. 6, some of the item images in set of images 610 are similar, or nearly identical, to others, and can be confusing to the user. In some embodiments, instead of presenting the item images in set of images 610 to the user, set of images 610 can be adjusted to generate set of images 620 by using a method (e.g., method 500 (FIG. 5)) to identify and group the item images that are similar or nearly identical. In many embodiments, set of images 610 can be converted into set of images 620 pursuant to settings of the system (e.g., 300, 310 (FIG. 3)), or a request of the user.

In some embodiments, the system or method can automatically select a respective representative image for each group of similar or identical images based on a criterion. In a number of embodiments, once the images are grouped, the items associated with the non-representative images can be removed from set of images 610 to generate set of images 620. In certain embodiments, system 300 and/or system 310 (FIG. 3) can create, in real-time, a new user interface (e.g., a web page) showing all the items associated with the grouped images in a group when the user selects/clicks the respective representative image of the group. In some embodiments, the criterion for the system or method to determine a respective representative image of a group of similar or identical images can be at least one of: (a) a popularity of a representative item associated with the representative item image among users; (b) a profit margin of the representative item; (c) a markup of the representative item; (d) a promotion of the representative item by a retailer; (e) a sales ranking of the representative item; and/or (f) a user rating for the representative item. In certain embodiments, the criterion can be the quality of the representative item image, the first item image in the group, or another suitable criterion. As shown in FIG. 6, the item images shown in set of images 620 can be representative images of the groups of images included in set of images 610.

In many embodiments, the techniques described herein can provide a practical application and several technological improvements. In some embodiments, the techniques described herein can provide for automatically determining a recommendation confidence for recommending one or more complementary items from an item catalog for an anchor item. These techniques described herein can provide a significant improvement over conventional approaches of excessive recommendations that are ineffective, possibly annoying, and/or waste network data bandwidth.

In many embodiments, the techniques described herein can beneficially generate a bit-operation model, which can convert the hash value or signature of an image into binary substrings and can leverage the efficiency and memory-saving features of a full-text search engine to search images in real-time based on the binary substrings. In many embodiments, the techniques described herein can be used in real-time at a scale that cannot be handled using manual techniques. For example, the number of unique images to be searched can be over tens or hundreds of thousands or even millions, and for some applications, such as an online retailer website, there can be hundreds or thousands of real-time user requests for searching or grouping similar images to be processed at any moment.

In a number of embodiments, the techniques described herein can solve a technical problem that arises only within the realm of computer networks, as systems or methods for indexing and searching digital data, such as images in a database, do not exist outside the realm of computer networks. Moreover, the techniques described herein can solve a technical problem that cannot be solved outside the context of computer networks. Specifically, the techniques described herein cannot be used outside the context of computer networks, in view of a lack of data.

Various embodiments can include a system including one or more processors and one or more non-transitory computer-readable media storing computing instructions configured to run on the one more processors and perform certain acts. The acts can include determining a first binary vector of first binary substrings for a first image. The act also can include obtaining a respective second binary vector comprising second binary substrings for each of second images from a database. The acts further can include determining a respective substring distance for each of the binary substrings for each of the second images. The respective substring distance can be between at least a pair of a first binary substring of the first binary substrings of the first binary vector and a respective corresponding second binary substring of the second binary substrings of the respective second binary vector for each of the second images.

Further, the acts can include after determining the respective substring distance for each of the binary substrings for each of the second images, when the respective substring distance for one or more of the second images is not greater than a predetermined substring distance threshold, including the one or more of the second images in a search result. The acts additionally can include determining a respective image distance for each respective third image of the search result, the respective image distance being between the first image and the each respective third image of the search result. Moreover, the acts can include after determining the respective image distance for the each respective third image of the search result, when the respective image distance is greater than the predetermined image distance threshold, culling the each respective third image from the search result.

A number of embodiments can include a method being implemented via execution of computing instructions configured to run at one or more processors and stored at one or more non-transitory computer-readable media. The method can include determining a first binary vector of first binary substrings for a first image. The method also can include obtaining a respective second binary vector comprising second binary substrings for each of second images from a database. The method additionally can include determining a respective substring distance for each of the binary substring for each of the second images, the respective substring distance being between at least a pair of a first binary substring of the first binary substrings of the first binary vector and a respective corresponding second binary substring of the second binary substrings of the respective second binary vector for each of the second images.

In some embodiments, the method further can include after determining the respective substring distance for each of the binary substring for each of the second images, when the respective substring distance for one or more of the second images is not greater than a predetermined substring distance threshold, including the one or more of the second images in a search result. The method also can include determining a respective image distance for each respective third image of the search result, the respective image distance being between the first image and the each respective third image of the search result. The method additionally can include after determining the respective image distance for the each respective third image of the search result, when the respective image distance is greater than the predetermined image distance threshold, culling the each respective third image from the search result.

Various embodiments can include a system comprising one or more processors; and one or more non-transitory computer-readable media storing computing instructions configured to, when run on the one or more processors, cause the one or more processors to perform one or more acts. The acts can include pre-screening second images from a database for a search result based on a first image and also based on respective substring distances between first binary substrings for the first image and respective second binary substrings for each of the second images. The acts also can include after the pre-screening, determining a respective image distance for each third image of third images of the search result, wherein the respective image distance is between the first image and the each third image of the third images of the search result. Further, the acts can include after determining the respective image distance for each third image of the third images of the search result, when the respective image distance for a particular one of the third images is greater than a predetermined image distance threshold, removing the particular one of the third images from the search result before the search result is displayed on a user device requesting the search result.

Various embodiments further can include a method being implemented via execution of computing instructions configured to run at one or more processors and stored at one or more non-transitory computer-readable media. The method can include pre-screening second images from a database for a search result based on a first image and also based on respective substring distances between first binary substrings for the first image and respective second binary substrings for each of the second images. The method further can include after the pre-screening, determining a respective image distance for each third image of third images of the search result, wherein the respective image distance is between the first image and the each third image of the third images of the search result. The method additionally can include after determining the respective image distance for each third image of the third images of the search result, when the respective image distance for a particular one of the third images is greater than a predetermined image distance threshold, removing the particular one of the third images from the search result before the search result is displayed on a user device requesting the search result.

Although the methods described above are with reference to the illustrated flowcharts, it will be appreciated that many other ways of performing the acts associated with the methods can be used. For example, the order of some operations may be changed, and some of the operations described may be optional, skipped or altered.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although using bit-operation and full-text searching techniques for image searching has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments.

For example, one or more of the procedures, processes, or activities of FIGS. 4-5 may include different procedures, processes, and/or activities and be performed by many different modules, in many different orders. As another example, one or more of the procedures, processes, and/or activities of one of FIGS. 4-5 can be performed in another one of FIGS. 4-5. As another example, the systems and/or subsystems within system 300 or system 310 in FIG. 3 can be interchanged or otherwise modified. Additionally, to one of ordinary skill in the art, it will be readily apparent that the systems and/or methods can be modified to search for k closest images (e.g., a k-nearest neighbor (k-NN) search), rather than images with distances (e.g., Hamming distances) less than r (e.g., a nearest neighbor search) as illustrated in the embodiments.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to, when run on the one or more processors, cause the one or more processors to perform:
after receiving a first image in a search query, pre-screening second images from a database for a search result based on the first image and also based on respective substring distances between first binary substrings for the first image and respective second binary substrings for each of the second images, comprising:
generating a first hash value for the first image;
dividing the first hash value into the first binary substrings, wherein each of the first binary substrings comprises respective consecutive bits of the first hash value; and for each second image of the second images:
   determining a respective substring distance of the respective substring distances between each substring pair of the first binary substrings and the respective second binary substrings of the each second image; and
   upon determining that the respective substring distance for each substring pair of the first binary substrings and the respective second binary substrings is not greater than a respective substring distance threshold, including the each second image in the search result;
after the pre-screening, determining a respective image distance for each third image of third images of the search result, wherein the respective image distance is between the first image and the each third image of the third images of the search result; and
after determining the respective image distance for each third image of the third images of the search result, when the respective image distance for a particular one of the third images is greater than a predetermined image distance threshold, removing the particular one of the third images from the search result before the search result is displayed on a user device that requested the search result.

2. The system in claim 1, wherein:
pre-screening the second images further comprises:
   determining a first binary vector, comprising minimizing a respective bit correlation within each of the first binary substrings by permutation; and
   the respective substring distance is between at least a pair of a first binary substring of the first binary substrings of the first binary vector and a respective corresponding second binary substring of the respective second binary substrings of a respective second binary vector for each of the second images.

3. The system in claim 2, wherein:
the permutation comprises bit swapping within each of the first binary substrings until a minimum cut cost is achieved.

4. The system in claim 3, wherein:
generating the first hash value comprises applying at least one of pHash, dHash, wHash, or aHash.

5. The system in claim 2, wherein:
the respective substring distance between at least the pair of the first binary substring of the first binary substrings of the first binary vector and the respective corresponding second binary substring of the respective second binary substrings of the respective second binary vector for each of the second images is a count of different pairs of bits between the first binary substring and the respective corresponding second binary substring.

6. The system in claim 2, wherein:
the respective image distance between the first image and each third image of the third images of the search result is determined based on a respective substring distance between each pair of the first binary substring of the first binary substrings of the first binary vector and a respective corresponding third binary substring of a third binary vector for the each third image.

7. The system in claim 1, wherein one or more of:
each of the respective substring distances is between at least a pair of a first binary substring of the first binary substrings of a first binary vector and a respective corresponding second binary substring of the respective second binary substrings of a respective second binary vector for each of the second images; or pre-screening the second images further comprises:
   obtaining, in real-time after determining the first binary vector, the second images by searching the database based on the first binary vector.

8. The system in claim 1, wherein:
each of the second images is indexed in the database based at least in part on a respective binary vector for each of the second images.

9. The system in claim 1, wherein the computing instructions are further configured to, when run on the one or more processors, cause the one or more processors to perform:
   receiving, from the user device and via a network, a search request associated with the first image;
   determining a representative image from the first image and the search result based on a criterion; and
   transmitting, via the network, the representative image to be displayed on the user device.

10. The system in claim 9, wherein:
the criterion for selecting the representative image is at least one of:
   a popularity of a representative item associated with the representative image among users;
   a profit margin of the representative item;
   a markup of the representative item;
   a promotion of the representative item by a retailer;
   a sales ranking of the representative item; or
   a user rating for the representative item.

11. A method being implemented via execution of computing instructions configured to run at one or more processors and stored at one or more non-transitory computer-readable media, the method comprising:
   after receiving a first image in a search query, pre-screening second images from a database for a search result based on the first image and also based on respective substring distances between first binary substrings for the first image and respective second binary substrings for each of the second images, comprising:
   generating a first hash value for the first image;
   dividing the first hash value into the first binary substrings, wherein each of the first binary substrings comprises respective consecutive bits of the first hash value; and
   for each second image of the second images:
      determining a respective substring distance of the respective substring distances between each substring pair of the first binary substrings and the respective second binary substrings of the each second image; and
      upon determining that the respective substring distance for each substring pair of the first binary substrings and the respective second binary substrings is not greater than a respective substring distance threshold, including the each second image in the search result;
   after the pre-screening, determining a respective image distance for each third image of third images of the search result, wherein the respective image distance is between the first image and the each third image of the third images of the search result; and
   after determining the respective image distance for each third image of the third images of the search result, when the respective image distance for a particular one of the third images is greater than a predetermined image distance threshold, removing the particular one of the third images from the search result before the search result is displayed on a user device that requested the search result.

12. The method in claim 11, wherein:

pre-screening the second images further comprises:
- determining a first binary vector, comprising minimizing a respective bit correlation within each of the first binary substrings by permutation; and
- the respective substring distance is between at least a pair of a first binary substring of the first binary substrings of the first binary vector and a respective corresponding second binary substring of the respective second binary substrings of a respective second binary vector for each of the second images.

13. The method in claim 12, wherein:

the permutation comprises bit swapping within each of the first binary substrings until a minimum cut cost is achieved.

14. The method in claim 13, wherein:

generating the first hash value comprises applying at least one of pHash, dHash, wHash, or aHash.

15. The method in claim 12, wherein:

the respective substring distance between at least the pair of the first binary substring of the first binary substrings of the first binary vector and the respective corresponding second binary substring of the respective second binary substrings of the respective second binary vector for each of the second images is a count of different pairs of bits between the first binary substring and the respective corresponding second binary substring.

16. The method in claim 12, wherein:

the respective image distance between the first image and each third image of the third images of the search result is determined based on a respective substring distance between each pair of the first binary substring of the first binary substrings of the first binary vector and a respective corresponding third binary substring of a third binary vector for the each third image.

17. The method in claim 11, wherein one or more of:

each of the respective substring distances is between at least a pair of a first binary substring of the first binary substrings of a first binary vector and a respective corresponding second binary substring of the respective second binary substrings of a respective second binary vector for each of the second images; or pre-screening the second images further comprises:
- obtaining, in real-time after determining the first binary vector, the second images by searching the database based on the first binary vector.

18. The method in claim 11, wherein:

each of the second images is indexed in the database based at least in part on a respective binary vector for each of the second images.

19. The method in claim 11 further comprising:

receiving, from the user device and via a network, a search request associated with the first image;

determining a representative image from the first image and the search result based on a criterion; and transmitting, via the network, the representative image to be displayed on the user device.

20. The method in claim 19, wherein:

the criterion for selecting the representative image is at least one of:
- a popularity of a representative item associated with the representative image among users;
- a profit margin of the representative item;
- a markup of the representative item;
- a promotion of the representative item by a retailer;
- a sales ranking of the representative item; or
- a user rating for the representative item.

\* \* \* \* \*